No. 839,344. PATENTED DEC. 25, 1906.
N. A. VURGASON.
EYEGLASS.
APPLICATION FILED MAY 4, 1906.

2 SHEETS—SHEET 1.

WITNESSES:
E. J. Stewart
Hubert D. Lawson

Nathan A. Vurgason,
INVENTOR

By C. A. Snow & Co.
ATTORNEYS

No. 839,344. PATENTED DEC. 25, 1906.
N. A. VURGASON.
EYEGLASS.
APPLICATION FILED MAY 4, 1906.

2 SHEETS—SHEET 2.

WITNESSES:
E. E. Stewart
Hubert D. Lawson

Nathan A. Vurgason,
INVENTOR
By C. A. Snow & Co
ATTORNEYS

THE NORRIS PETERS CO., WASHINGTON, D. C.

UNITED STATES PATENT OFFICE.

NATHAN A. VURGASON, OF BARTOW, FLORIDA.

EYEGLASS.

No. 839,344.

Specification of Letters Patent.

Patented Dec. 25, 1906.

Application filed May 4, 1906. Serial No. 315,195.

*To all whom it may concern:*

Be it known that I, NATHAN A. VURGASON, a citizen of the United States, residing at Bartow, in the county of Polk and State of Florida, have invented a new and useful Eyeglass, of which the following is a specification.

This invention relates to attachments for spectacles.

Jewelers and others in the habit of using magnifying-glasses of the type fitted to the eyes have heretofore been placed at a disadvantage if spectacles are worn, because it has been necessary to remove the spectacles in order to place the magnifying - glasses in proper position over the eyes, this removal of the spectacles obviously impairing the vision.

The object of this invention is to provide a magnifying-glass which constitutes an attachment for spectacles and which can be quickly swung into or out of proper position.

A still further object is to provide an attachment capable of being adjusted to the eye of the user.

With the above and other objects in view the invention consists of a clamp of novel form adapted to be fastened to spectacles at the point of connection between a rim and one of the temples. A stem projects forward from the clamp, and adjustably mounted upon this stem is an arm projecting from an auxiliary rim containing a magnifying-glass. Means are provided for supporting this glass directly in front of one of the lenses of the spectacles and for supporting the glass in raised position, so as not to interfere with the vision.

The invention also consists of certain other novel features of construction and combinations of parts, which will be hereinafter more fully described, and pointed out in the claims.

In the accompanying drawings is shown the preferred form of the invention.

Figure 1:
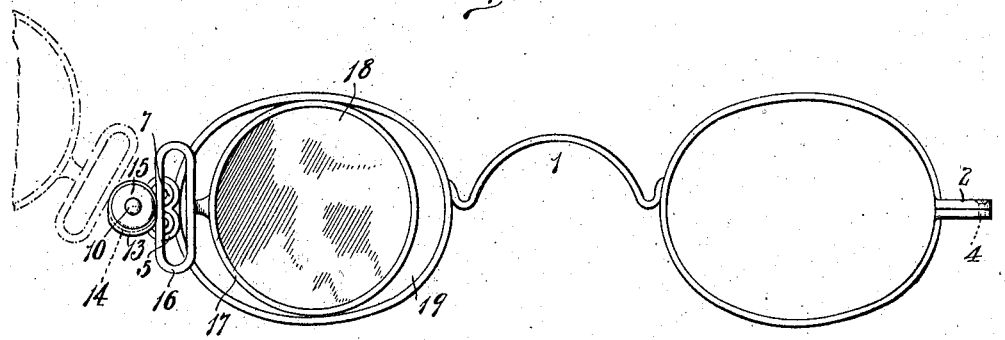
Figure 2:
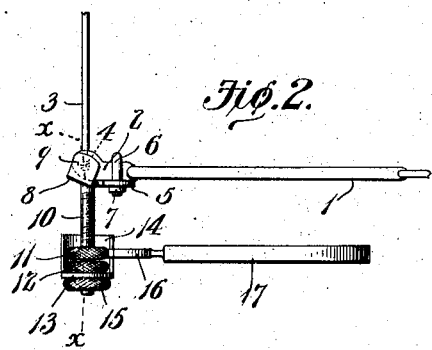
Figure 3:
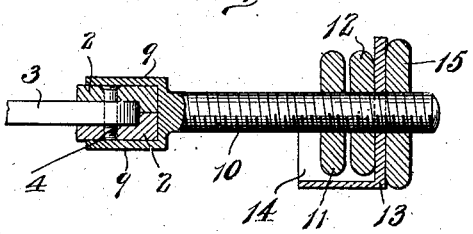
Figure 4:
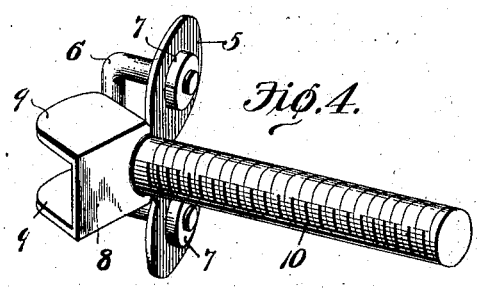
Figure 5:
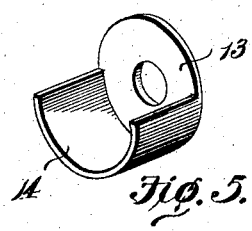
Figure 6:
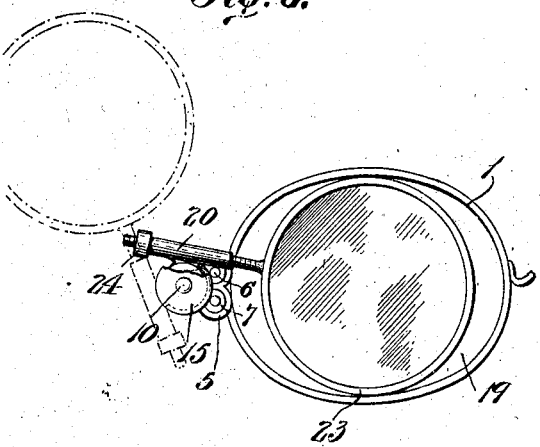
Figure 7:
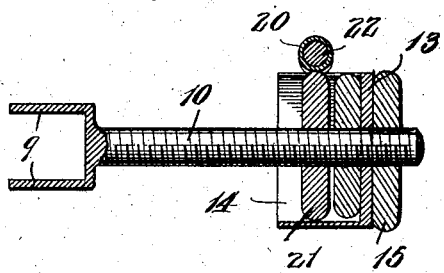
Figure 8:
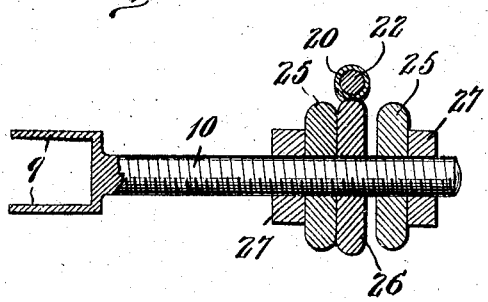
Figure 9:
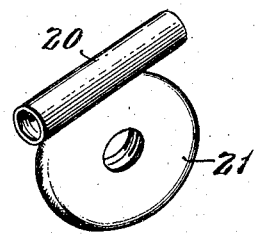

In said drawings, Figure 1 is a front elevation of a pair of spectacles having the improved magnifying-glass connected thereto, the position of the glass when not in use being indicated by dotted lines. Fig. 2 is a plan view of the magnifying-glass and the part of the spectacles adjacent thereto. Fig. 3 is an enlarged vertical section on line $x\,x$, Fig. 2. Fig. 4 is a perspective view of the clamp and the stem projecting from it. Fig. 5 is a detail view of the stop. Fig. 6 is a front elevation of a portion of a pair of spectacles, showing the magnifying-glass provided with a modified form of connecting device. Fig. 7 is a section through the clamp, stop, and the connecting device. Fig. 8 is a similar section, showing a modified means for stopping or limiting the movement of the magnifying-glass; and Fig. 9 is a detail view of the modified means utilized for connecting the magnifying - glass to the stem of the clamp.

Referring to the figures by characters of reference, 1 is the frame of a pair of spectacles, having ears 2 extending from the ends thereof in the usual manner and constituting bearings for temples 3, mounted on pivot-screws 4. Bearing upon the front face of the ear at one end of the frame 1 is a plate 5, through the ends of which extend the threaded ends of a yoke 6, which embraces the ear and has nuts 7 for clamping plate 5 firmly upon the ear. An extension 8 projects from the outer edge of the plate 5 at an angle thereto and has parallel ears 9, which embrace the ear 2 and, in conjunction with the yoke 6, serves to positively hold plate 5 immovably upon the frame. A screw-threaded stem 10 extends forward from plate 5, and a nut 11 is adjustably mounted thereon. A clamping-nut 12 is also located on the stem, and interposed between the two nuts is a washer 13, having a laterally - extending curved projection 14, constituting a stop and partly surrounding the nut 11 and a portion of the stem 10. A nut 15 is mounted on the stem between frame 1 and nut 11, and this nut is permanently secured to the center of one side of a longitudinally-slotted arm 16. To the center of the other side of this arm is permanently secured a rim 17, surrounding a magnifying-glass 18. The projection 14 is adapted to be adjusted about the stem 10, so as to contact with the lower portion of arm 16 and support the glass 18 directly in front of the adjoining lens 19 of the spectacles. After the projection has been adjusted to this position the outer nut 12 is screwed against the washer 13, so as to clamp it upon the nut 11. The projection will thus be immovably secured, and it is of such proportions that when the glass 18 is swung upward it will move past the stem 10 and rest by gravity upon the upper portion of projection 14. It will thus be seen that the glass 18 can be quickly thrown into or out of operative position.

If desired, instead of utilizing the slotted arm 16 a sleeve 20 may be arranged upon a nut 21 on stem 10 and receive a threaded stem 22, extending radially from the frame 23 of the magnifying-glass. A nut 24 is disposed upon the stem 22, and with this construction the magnifying-glass can be adjusted laterally in order to assume a proper position in front of the eye.

In lieu of utilizing the stop or projection 14 the nut to which the magnifying-glass is connected may be arranged between two stop-nuts 25, mounted on the stem and adapted to limit the rotation of the glass-carrying nut 26, so that the glass can be swung into or out of operative position, but will be properly limited during such movement. Where these stop-nuts 25 are employed, lock-nuts 27 are preferably utilized for holding them in adjusted position.

It will be seen that this attachment can be readily applied to various forms of spectacles and the magnifying-glass can be easily moved into or out of operative position.

While the attachment is particularly adapted for use in connection with spectacles such as constantly worn by some jewelers and others whose business requires the use of magnifying-glasses, it is to be understood that spectacles without lenses or with lenses with plain glass can be used merely as a means for holding the magnifying-glass in proper position before the eye and without effort on the part of the user.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the invention.

What is claimed is—

1. An attachment for spectacles comprising a plate, means for clamping the same upon the frame of spectacles, a screw-threaded stem projecting from the plate, rotatable means adjustably mounted upon the stem, a glass carried thereby, and means on the stem for limiting the movement of the rotatable means and supporting the glass.

2. An attachment for spectacles comprising a clamp, a screw-threaded stem projecting therefrom, a rotatable device adjustably mounted on the stem, a glass adjustably connected to said device, and means for limiting the movement of the rotatable device and supporting the glass.

3. The combination with spectacles; of a clamp secured to one end of the frames thereof, a forwardly-projecting stem upon the clamp, a rotatable device adjustably mounted on the stem, a sleeve carried thereby, a glass, a stem connected thereto and adjustably mounted within the sleeve, and means for supporting the glass in, or out of, alinement with a lens of the spectacles.

In testimony that I claim the foregoing as my own I have hereto affixed my signature in the presence of two witnesses.

NATHAN A. VURGASON.

Witnesses:
 E. W. CODINGTON,
 J. HELLROOK.